Figure 1:
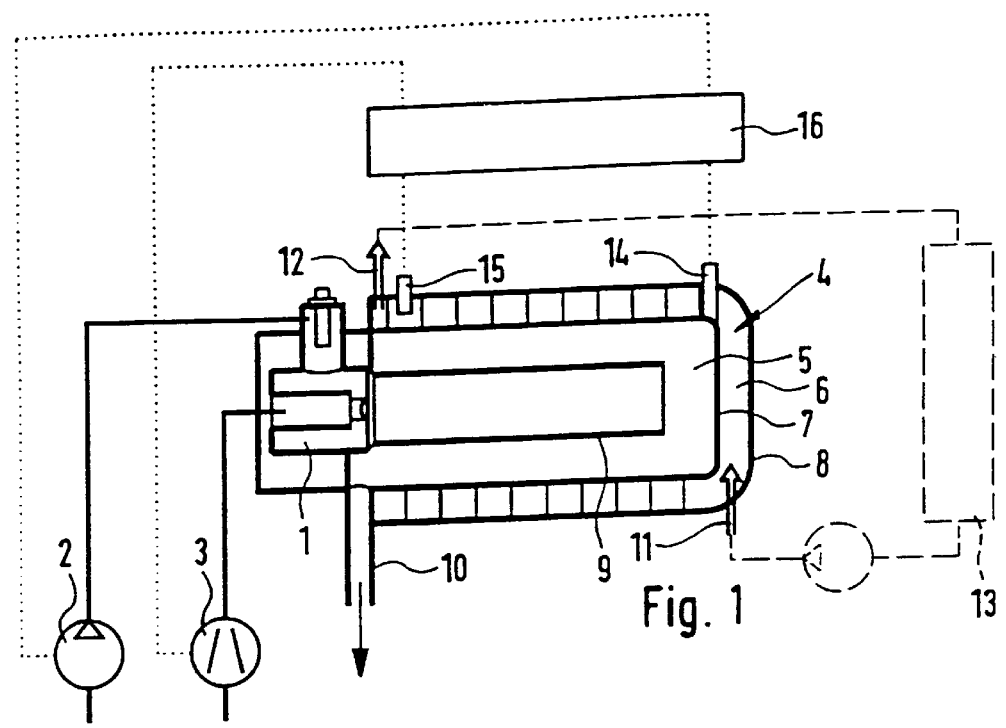

United States Patent [19]
Pfister et al.

[11] Patent Number: 6,006,997
[45] Date of Patent: Dec. 28, 1999

[54] HEATING APPLIANCE, IN PARTICULAR FOR HEATING A MOTOR VEHICLE PASSENGER COMPARTMENT

[75] Inventors: Wolfgang Pfister, Esslingen; Jürgen Epple, Waldenbuch; Stefan Ottenbacher, Pliezhausen; Andreas Alber, Stuttgart, all of Germany

[73] Assignee: J. Eberspächer GmbH & Co., Germany

[21] Appl. No.: 08/945,971

[22] PCT Filed: Jul. 2, 1996

[86] PCT No.: PCT/DE96/01225

§ 371 Date: Oct. 29, 1997

§ 102(e) Date: Oct. 29, 1997

[87] PCT Pub. No.: WO97/02516

PCT Pub. Date: Jan. 23, 1997

[30] Foreign Application Priority Data

Jul. 4, 1995 [DE] Germany .......................... 195 24 260

[51] Int. Cl.⁶ .................................................. G05D 23/00
[52] U.S. Cl. .................. 237/2 A; 237/12.3 C; 236/78 D
[58] Field of Search ............................ 237/2 A, 12.3 C; 236/78 D, 21 B; 318/610

[56] References Cited

U.S. PATENT DOCUMENTS

| | | | |
|---|---|---|---|
| 4,640,262 | 2/1987 | Lucius | 126/110 B |
| 4,685,616 | 8/1987 | Stein | 237/12 |
| 4,700,052 | 10/1987 | Wolf et al. | 219/497 |
| 4,726,514 | 2/1988 | Adam | 237/2 A |
| 4,984,736 | 1/1991 | Reiser et al. | 237/2 A |
| 5,037,292 | 8/1991 | Steiert | 431/18 |

FOREIGN PATENT DOCUMENTS

| | | |
|---|---|---|
| 61-7481 | 3/1986 | Japan . |
| 61-7481 | 7/1986 | Japan . |
| 61-265444 | 11/1986 | Japan . |
| 1-113814 | 5/1989 | Japan . |
| 5-149539 | 6/1993 | Japan . |

*Primary Examiner*—Henry Bennett
*Assistant Examiner*—Derek S. Boles
*Attorney, Agent, or Firm*—McGlew and Tuttle, P.C.

[57] ABSTRACT

The invention concerns a heating appliance which is protected against overheating in that the temperature increase during operation of the appliance is monitored. If the temperature increases too rapidly, the heating operation is stopped. According to the invention, temperature increase values are determined in a close chronological succession and/or a mean value is calculated in order to compensate signal noise from the temperature sensor.

13 Claims, 1 Drawing Sheet

HEATING APPLIANCE, IN PARTICULAR FOR HEATING A MOTOR VEHICLE PASSENGER COMPARTMENT

The present invention pertains to a heater, especially for heating the interior space of a motor vehicle, with a controllable burner used as a heat source, a heat exchanger, which transfers the heat of combustion to a hydraulic heat transfer medium, especially water, and which is traversed by combustion gases on one side of a gas jacket and by hydraulic heat transfer medium on the other side of the gas jacket, an overheating sensor, which, being preferably arranged on the hydraulic side, is in direct heat-conducting contact with the gas jacket and generates signals reflecting the temperature, and a signal evaluation unit, which determines a temperature gradient from temperature signals following each other at time intervals and stops the burner when a threshold value of the temperature gradient is exceeded.

Such a heater is the subject of an older, not previously published Patent Application No. P 44 46 829.6 (=P 1514/1). The monitoring of the temperature gradient offers the advantage that an operating state involving the risk of overheating can be recognized very early, i.e., considerably before undesirably high temperatures develop. This is based on the fact that a risk of overheating can occur essentially only when the output of the burner is too high compared with the throughput of the hydraulic medium in the heat exchanger and a high temperature gradient, i.e., a rapid increase in temperature, will correspondingly develop.

Since the burner is switched off already at the time of the onset of the risk of overheating, but before the onset of overheating, in the case of temperature gradient monitoring, other measures are unnecessary if the burner is to be switched on again later.

The object of the present invention is to detect the risk of overheating especially reliably and early.

This object is accomplished according to the present invention by the signal evaluation unit operating with different threshold values of the temperature gradient as a function of the temperature determined.

The present invention is based on the general idea that a comparatively rapid increase in temperature can be allowed to occur without the risk of overheating as long as the temperature level is low and thus it remains markedly below a dangerous temperature level.

In contrast, the increase in temperature shall be slowed down once higher temperatures have been reached, because unacceptably high temperatures could otherwise be reached in a short time, or overheating could still occur because of the residual heat present after the switching off of the heater.

The permissible temperature-dependent threshold value can be preset, in particular, as a function of the temperature present at the time of the switching on of the burner.

In addition to this or as an alternative, provisions may be made in the heater described in the introduction for the signal evaluation unit to scan the temperature at a high cycle frequency and to determine a mean value of the temperature gradient for a past time interval.

According to an advantageous embodiment of the present invention, this can happen in such a way that temperature values which are spaced from each other in time by a predetermined interval that is long compared with the cycle intervals are processed in terms of a subtraction from among the temperature values scanned at high cycle frequency.

Thus, it becomes possible as a result to determine temperature gradient values following each other at short intervals in time, according to the cycle frequency and at the same time to prevent inevitable variations in the signal or signal noise of the sensors from leading to highly incorrect values of the temperature gradients determined.

Provisions may also be made, in a basically known manner, to arrange an additional temperature sensor in heat-conducting contact with the hydraulic medium in the hydraulic medium, especially at the hydraulic outlet of the heat exchanger. The signal processing unit may operate in this case according to the present invention such that the burner will be switched off when a temperature difference exceeding a temperature-dependent threshold value appears between the sensors.

The circumstance that a comparatively great temperature difference may develop between the gas jacket and the hydraulic medium at a low temperature level, while the risk of overheating could already appear at a similarly great temperature difference at a higher temperature level is taken into account here.

The present invention will be explained in greater detail below on the basis of the drawings.

Figure 2:
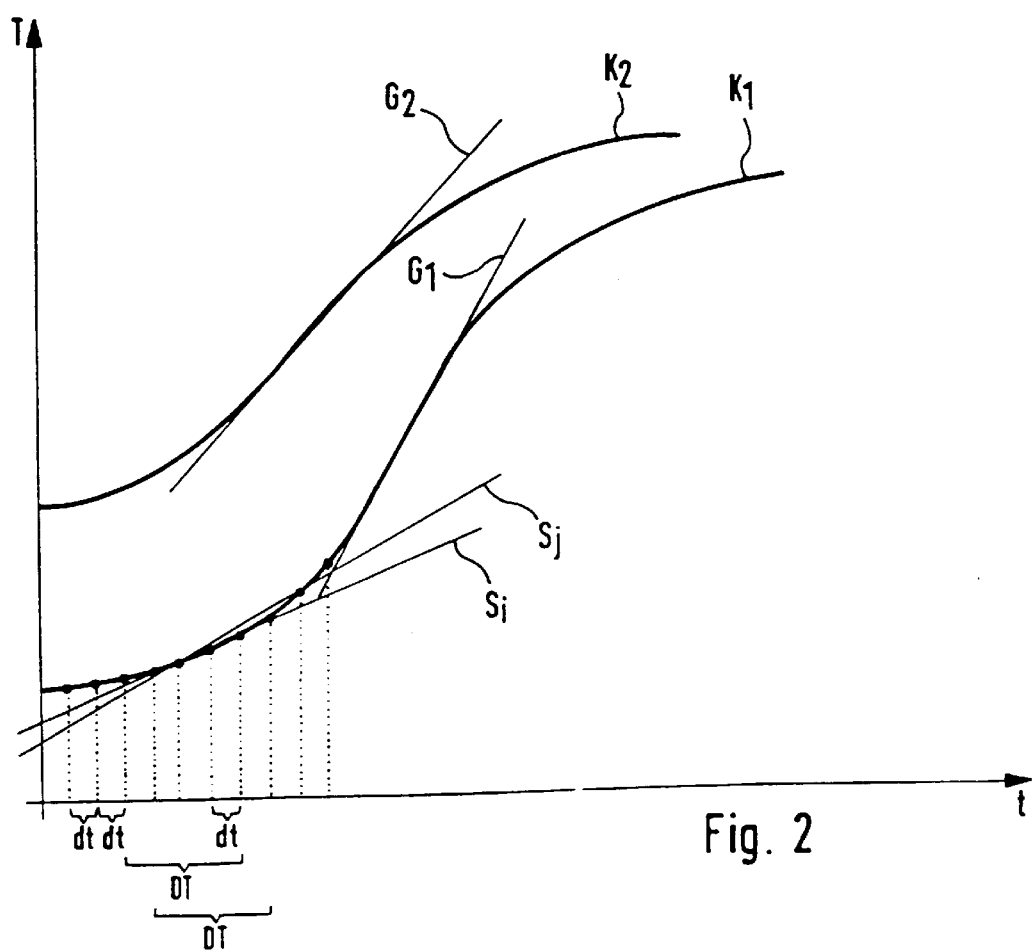

In the drawings,

FIG. 1 shows a schematic sectional view of a heater according to the present invention, and FIG. 2 shows a diagram showing typical temperature curves over time.

The heater according to FIG. 1 has, in a basically known manner, a combustion chamber 1, to which fuel can be fed via a feed pump 2 and to which combustion air can be fed via a blower 3 in a controllable manner. The combustion chamber 1 is joined by a heat exchanger 4, which has a gas space 5, through which the combustion gases leaving the combustion chamber 1 flow, as well as a hydraulic space 6, which is traversed by a hydraulic heat transfer medium, usually water, and is closed by a gas jacket 7 against the gas space 5 and by a water jacket 8 to the outside. The combustion gases enter the gas space 5 via a flame tube 9 arranged at the combustion chamber 1 at the outlet side and are deflected at the end of the gas space 5 facing away from the combustion chamber 1, so that they may be discharged to the outside via a waste gas line 10 and an exhaust muffler, not shown, after they have flowed along the wall of the gas jacket 7 while transferring heat to the hydraulic medium.

The hydraulic heat transfer medium, which is guided by corresponding guide webs on the outside of the gas jacket 7, flows through the hydraulic space 6 in a helical pattern from an inlet 11 to an outlet 12 in a circuit, which leads over one or more heating elements 13 and/or over the cooling circuit of a motor vehicle engine.

An overheating sensor 14, which is in direct heat-conducting contact with the gas jacket 7, is arranged close to the inlet 11 located away from the combustion chamber 1, and the said overheating sensor 14 is tensioned against the outside of the gas jacket 7 by means of suitable tensioning elements, e.g., springs, in order to guarantee good heat transfer. The overheating sensor 14 is also swept by the hydraulic heat transfer medium, with which the overheating sensor 14 is also in heat-conducting contact.

A temperature sensor 15, which is located at a spaced location from the gas jacket 7 and can detect essentially only the temperature of the hydraulic heat transfer medium, is arranged close to the outlet 12.

The sensors 14 and 15 are connected to the inlet side of a signal evaluation unit 16, which is used to control the combustion process, i.e., to control the feed pump 2 as well as the blower 3.

The signals of the temperature sensor 15 are used primarily to control the output of the heater.

The signals of the overheating sensor 14 are used alone or in combination with the signals of the temperature sensor 15 to offer a safeguard against overheating.

This will be explained on the basis of the diagram shown in FIG. 2, whose abscissa shows the time t and whose ordinate shows the temperature T.

The curves $K_1$, and $K_2$ show as an example two desired temperature curves at the overheating sensor 14 as a function of the time t. In the case of curve $K_1$, the burner operation of the heater is switched on at a relatively low temperature $T_1$, while the operation begins at a comparatively markedly higher initial temperature $T_2$ in the case of curve $K_2$. A comparatively steeper maximum increase in temperature, i.e., a high temperature gradient over time, is permissible without the risk of overheating in the case of the lower initial temperature $T_1$, whereas only a smaller maximum temperature gradient shall occur in the case of the higher initial temperature $T_2$. In the representation in FIG. 2, the maximum temperature gradients are illustrated by the slope of the straight lines $G_1$ and $G_2$, which tangentially touch the curves $K_1$, and $K_2$, respectively, at the points of their greatest steepness.

The signal evaluation unit 16 now detects the temperature signals of the overheating sensor 14 at a comparatively high cycle frequency, i.e., there is only a small time difference dt between temperature values detected one after another. All measured values detected are stored for a longer past time interval DT. The temperature difference between the most recent measured value and the oldest measured value is then determined within this time interval DT. This temperature difference changes analogously to the actual temperature gradient.

The measured value evaluation shown prevents, on the one hand, a possible dispersion or a possible signal noise of the overheating sensor 14 from being able to lead to greater errors in the determination of the temperature gradient. Since the temperature gradient actually determined is clearly represented by the slope of a straight line Si, Sj, which passes through two measurement points at the relatively great time interval DT, slight changes in the measured values due to interference effects do not lead to any appreciable change in the slope of the straight line Si, Sj, etc.

On the other hand, consecutive values of the temperature gradient follow each other at short time intervals, because the distance in time between consecutive values of the temperature gradient corresponds to the duration of the short time interval dt.

Due to the fact that the signal evaluation unit 16 also takes into account maxima of the temperature gradient which depend on the actual temperature level, i.e., the signal evaluation unit 16 "knows" that only comparatively small temperature gradients shall occur at a higher temperature level, the actual operating state can be taken into account for safeguarding against overheating, and a rapid increase in temperature can be made possible especially at a low temperature level, when a high heat demand may be present.

In addition, the signal evaluation unit can also evaluate the temperature differences between the sensors 14 and 15, and maximum differences depending on the actual temperature level can likewise again be permitted.

As soon as the maximum temperature differences or the maximum temperature gradients explained above are exceeded, at least the feed pump 2 is stopped in order to end the combustion process in the combustion chamber 1.

We claim:

1. A heater comprising:

a controllable burner generating heat;

heat exchanger means connected to said controllable burner and having a hydraulic heat transfer medium, said heat exchanger means transferring said heat from said burner to said hydraulic heat transfer medium;

a temperature sensor means connected to said heat exchanger means and for measuring a temperature of said heat exchanger means, said temperature sensor means also generating a plurality of individual temperature signals representing said temperature at plurality of successive time intervals;

a signal evaluation unit for determining a plurality of temperature gradients from said plurality of temperature signals, said signal evaluation unit also controlling said burner and stopping operation of said burner when one of said plurality of temperature gradients exceed a gradient threshold value, said signal evaluation unit using different said gradient threshold values dependent on an actual magnitude of said temperature.

2. A heater in accordance with claim 1, wherein:

said heat exchanger means includes a gas jacket and combustion gases from said burner traverse by one side of said gas jacket, said heat transfer medium is water and traverses on other side of said gas jacket;

said temperature sensor means is arranged on a hydraulic side of said heat exchanger means, said temperature sensor means is in direct heat-conducting contact with said gas jacket and generates signals reflecting a temperature of said gas jacket.

3. A heater in accordance with claim 1, wherein:

said signal evaluation unit determines an average temperature gradient over a plurality of said time intervals.

4. A heater in accordance with claim 3, wherein:

said signal evaluation unit determines said average temperature gradient at each time interval.

5. A heater in accordance with claim 1, wherein:

said signal evaluation unit determines an average temperature gradient by subtracting two of said temperature signals. separated by a plurality of said time intervals.

6. A heater in accordance with claim 5, wherein:

said signal evaluation unit determines said average temperature gradient at each time interval.

7. A heater in accordance with claim 1, wherein:

another temperature sensor means is connected to said heat exchanger means at a location spaced from said temperature sensor means and for measuring another temperature of said heat exchanger means, said another temperature sensor means also generating a plurality of individual another temperature signals representing said another temperature;

said signal evaluation unit determines a temperature difference between said temperature and said another temperature, said signal evaluation unit stopping operation of said burner when said temperature difference exceeds a difference threshold value.

8. A heater in accordance with claim 7, wherein:

said signal evaluation unit using different said difference threshold values dependent on an actual magnitude of said temperature.

9. A heater in accordance with claim 7, wherein:

said another temperature sensor means is located at a hydraulic outlet of said heat exchanger means and generates said another temperature signals at said successive time intervals.

10. A heater in accordance with claim 6, wherein:

another temperature sensor means is connected to said heat exchanger means at a location spaced from said temperature sensor means and for measuring another temperature of said heat exchanger means, said another temperature sensor means also generating a plurality of individual another temperature signals representing said another temperature;

said signal evaluation unit determines a temperature difference between said temperature and said another temperature, said signal evaluation unit stopping operation of said burner when said temperature difference exceeds a difference threshold value, said signal evaluation unit uses different said difference threshold values dependent on an actual magnitude of said temperature.

11. A heater comprising:

a controllable burner generating heat;

heat exchanger means connected to said controllable burner and having a hydraulic heat transfer medium, said heat exchanger means transferring said heat from said burner to said hydraulic heat transfer medium;

a temperature sensor means connected to said heat exchanger means and for measuring a temperature of said heat exchanger means, said temperature sensor means also generating a plurality of individual temperature signals representing said temperature at a plurality of successive time intervals;

a signal evaluation unit for determining a plurality of temperature gradients from said plurality of temperature signals, said signal evaluation unit also controlling said burner and stopping operation of said burner when one of said temperature gradients exceed a gradient threshold value, said signal evaluation unit determines an average temperature gradient over a plurality of said time intervals.

12. A heater in accordance with claim 11, wherein:

said signal evaluation unit determines said average temperature gradient at each time interval.

13. A heater comprising:

a controllable burner generating heat;

heat exchanger means connected to said controllable burner and having a hydraulic heat transfer medium, said heat exchanger means transferring said heat from said burner to said hydraulic heat transfer medium;

a temperature sensor means connected to said heat exchanger means and for measuring a temperature of said heat exchanger means, said temperature sensor means also generating a plurality of individual temperature signals representing said temperature at successive time intervals;

another temperature sensor means is connected to said heat exchanger means at a location spaced from said temperature sensor means and for measuring another temperature of said heat exchanger means, said another temperature sensor means also generating a plurality of individual another temperature signals representing said another temperature;

a signal evaluation unit for determining a plurality of temperature difference between said temperature and said another temperature, said signal evaluation unit also controlling said burner and stopping operation of said burner when said temperature difference exceeds a difference threshold value, said signal evaluation unit using different said difference threshold values dependent on an actual magnitude of said temperature.

\* \* \* \* \*